United States Patent
Osterman et al.

(10) Patent No.: US 6,417,768 B2
(45) Date of Patent: *Jul. 9, 2002

(54) METHOD OF ASSEMBLING A MONITOR ON A BRAKE ACTUATOR

(75) Inventors: Paul S. Osterman, Eugene; Walter E. Heron, Veneta, both of OR (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/894,622

(22) Filed: Jun. 28, 2001

Related U.S. Application Data

(62) Division of application No. 09/512,504, filed on Feb. 24, 2000, now Pat. No. 6,255,941.

(51) Int. Cl.[7] .................................................. B60Q 1/44
(52) U.S. Cl. ........................ 340/479; 340/453; 340/454; 188/1.11 W; 188/1.11 E
(58) Field of Search ................................. 340/479, 453, 340/454, 452, 450.1; 188/1.11 E, 1.11 W

(56) References Cited

U.S. PATENT DOCUMENTS

| | | | | |
|---|---|---|---|---|
| 3,571,800 A | * | 3/1971 | Taylor et al. ............... 340/166 |
| 3,622,926 A | * | 11/1971 | Risk ............................ 335/205 |
| 3,805,228 A | * | 4/1974 | Pepples ....................... 340/52 |
| 3,845,430 A | * | 10/1974 | Petkewicz et al. .......... 335/108 |
| 4,364,011 A | * | 12/1982 | Bloomfield et al. ........ 324/174 |
| 4,468,650 A | * | 8/1984 | Barbee ........................ 340/58 |
| 4,476,449 A | * | 10/1984 | Gray et al. .................. 335/138 |
| 4,642,603 A | * | 2/1987 | Martinez, Jr. ................ 340/52 |
| 4,674,338 A | * | 6/1987 | Carpenter ................ 73/861.77 |
| 4,757,300 A | * | 7/1988 | Sebalos ....................... 340/52 |
| 4,914,916 A | * | 4/1990 | Leigh-Monstevens et al. ............................ 60/534 |
| 4,937,554 A | * | 6/1990 | Herman ...................... 340/453 |
| 5,087,907 A | * | 2/1992 | Weiler et al. ............... 340/454 |
| 5,266,917 A | * | 11/1993 | Bleeke et al. ................ 338/32 |
| 5,285,190 A | * | 2/1994 | Humphreys et al. ........ 340/453 |
| 5,302,939 A | * | 4/1994 | Downs et al. .............. 340/447 |
| 5,310,023 A | * | 5/1994 | Martinez .................... 188/1.11 |
| 5,320,198 A | * | 6/1994 | Hoyt et al. ................. 188/1.11 |
| 5,322,641 A | * | 6/1994 | Shiel et al. .................. 252/514 |
| 5,339,069 A | * | 8/1994 | Penner et al. ............... 340/453 |
| 5,394,137 A | * | 2/1995 | Orschek ..................... 340/453 |
| 5,433,296 A | * | 7/1995 | Webberley ................. 188/1.11 |
| 5,450,930 A | * | 9/1995 | Martens et al. ............ 188/1.11 |
| 5,472,539 A | * | 12/1995 | Saia et al. ................... 156/155 |
| 5,545,368 A | * | 8/1996 | Vinarcik .................... 264/437 |
| 5,572,187 A | * | 11/1996 | Williford .................... 340/454 |
| 5,825,287 A | * | 10/1998 | Zarybnicky et al. ........ 340/453 |
| 6,255,941 B1 | * | 7/2001 | Osterman et al. .......... 340/479 |

\* cited by examiner

Primary Examiner—Daryl Pope
(74) Attorney, Agent, or Firm—Howard & Howard

(57) ABSTRACT

A vehicle brake monitor for a brake actuator including a housing, a reciprocal push rod extending through an opening in the housing and a stone shield mounted in the housing opening. An annular sleeve surrounds the push rod which is integrally formed of plastic including opposed sleeve portions which are generally semicircular in cross-section and a longitudinal integral flexible hinge portion interconnecting the adjacent sides of the sleeve portions, such that the annular sleeve may be received on the push rod, and an adjustable connector element interconnecting the opposed sides of the sleeve portions. The sleeve includes an elongated magnet, preferably a ceramic magnet having face portions which are magnetized with adjacent north and south poles and the stone shield includes a Hall-effect sensor which senses the location of the sleeve as the push rod reciprocates through the stone shield.

19 Claims, 3 Drawing Sheets

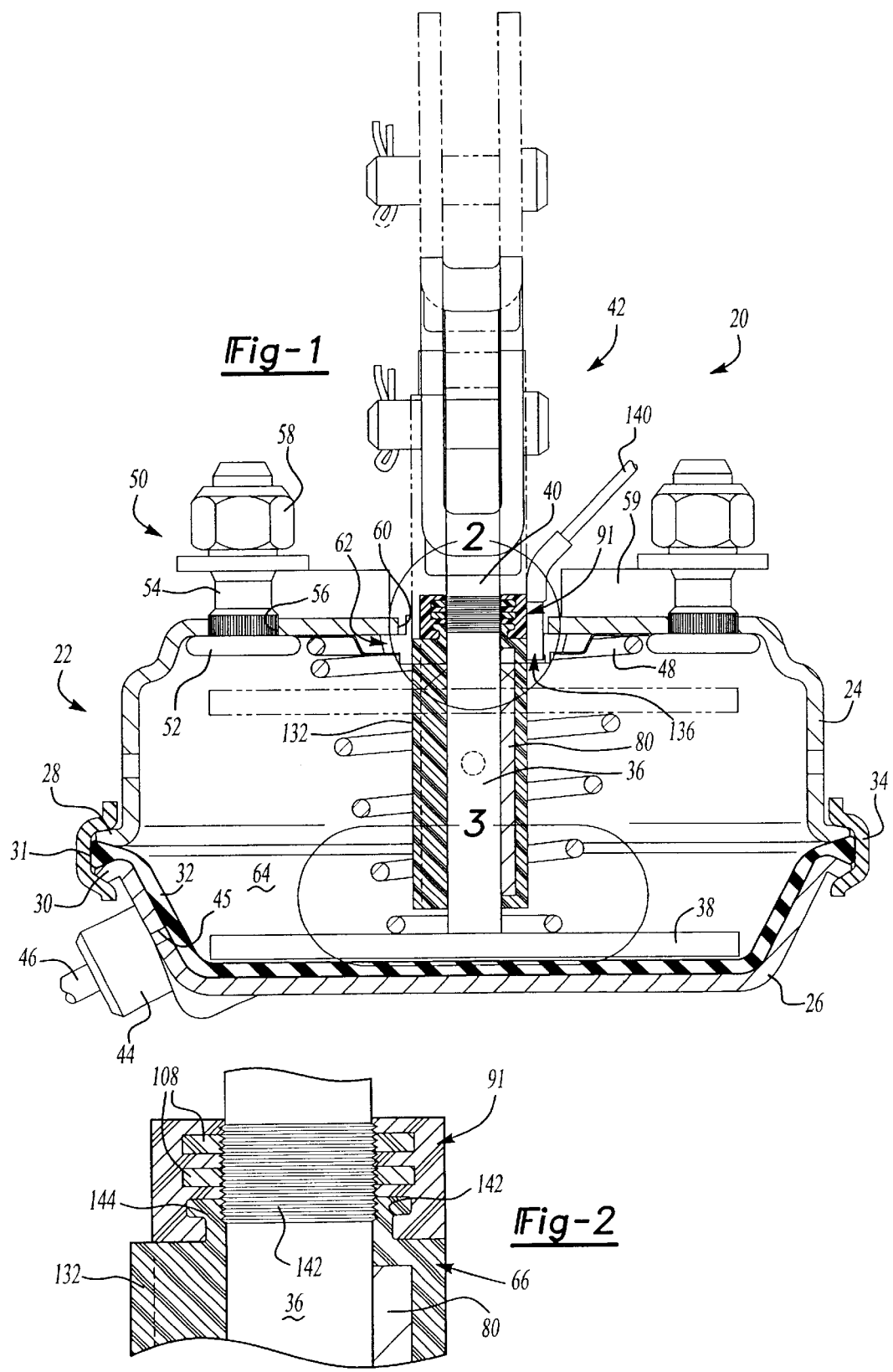

METHOD OF ASSEMBLING A MONITOR ON A BRAKE ACTUATOR

This application is a divisional of U.S. application Ser. No. 09/512,504 filed Feb. 24, 2000, now U.S. Pat. No. 6,255,941.

FIELD OF THE INVENTION

The present invention relates to an improved brake monitoring system, particularly for use on heavy vehicles, such as a tractor and trailer combination, buses and the like, having a spring brake actuator.

BACKGROUND OF THE INVENTION

Heavy-duty trucks, buses and other large vehicles are typically equipped with a pneumatic brake actuating system. The brake actuating system typically applies air under pressure to a service chamber of a brake actuator to move a diaphragm in a first direction. A push rod typically moves with the diaphragm and the push rod is connected to a linkage which actuates the vehicle brakes. An emergency chamber having a power spring and a second diaphragm is typically mounted on the service chamber and is operable to move the push rod and actuate the brakes in the event that the pneumatic vehicle system fails or when the vehicle is turned off when the vehicle is parked. Thus, the emergency chamber serves as an emergency braking system for the vehicle and a parking brake.

A brake actuator has a predetermined amount of available movement of the push rod or stroke of the push rod. The amount of movement of the push rod required to fully actuate the braking system of the vehicle should be carefully monitored, such that it is within the stroke of the push rod of the brake actuator. Excessive movement of the push rod can be created by one of several factors. Typically, excessive movement of the push rod is due to brake lining wear. As the brakes wear, more movement of the push rod is required to actuate the brakes. Further, as the linkages and connections between the push rod and the linkages, et cetera, bend or become loose or excessively worn, additional push rod movement may be required to actuate the brakes. A combination of these several factors may sometimes cause the amount of push rod movement required to actuate the brakes approach the available push rod movement or stroke available from the brake actuator. As will be understood, this is an undesirable situation.

The prior art has proposed various methods and apparatus to monitor the push rod movement during actuation of the brake and provide some indication to an operator as to when there is excessive push rod movement, which is referred to as "overstroke." As will be understood, a determination of when there is excessive push rod movement or overstroke is dependent upon the designed or rated stroke of the brake actuator. For example, the push rod of a typical brake actuator includes a brightly colored ring, which may be painted on the push rod, which indicates an overstroke condition when the ring extends out of the brake actuator during actuation of the brakes. The ring may, however, be difficult to see because of the location of the brake actuators beneath the truck or trailer and accumulated road debris. Automatic slack adjusters located between the push rod and the foundation brake are also conventionally used, wherein the slack adjuster incrementally adjusts to compensate for slack in the braking system and to decrease the required push rod movement.

The prior art has also proposed various electronic monitoring systems which generally monitor either the stroke of the push rod or the movement of the linkages between the push rod and the foundation brake including the slack adjuster. However, there are several obstacles to be overcome. First, powering and monitoring electronic indicators on each brake actuator of an 18-wheel vehicle is costly. Further, the hostile environment in which the brake actuators are mounted beneath the vehicle can damage the monitoring system, particularly where there are exposed pistons, sleeves, sensors, et cetera. Finally, where the stroke of the push rod is monitored by the brake monitoring system, it is essential that the push rod stroke monitoring system be accurately assembled on the brake actuator and be able to withstand the hostile environment of the brake actuator. Finally, it is desirable that the components of the brake monitoring system be easily and accurately assembled on the brake actuator without special tools.

SUMMARY OF THE INVENTION

The present invention relates to an improved brake monitoring system which may include a plurality of brake monitors mounted on each of the plurality of brake actuators of a vehicle. As set forth above, a conventional brake actuator includes a housing having an opening therethrough, a reciprocal rod or push rod extending through the housing opening and typically an annular stone shield mounted within the housing opening surrounding the push rod preventing debris from entering the brake actuator housing.

In the improved brake monitoring system of this invention, an improved elongated annular sleeve is received around the push rod which is fixed relative to the push rod and contains one of the sensor elements. The other sensor element is fixed relative to the brake actuator housing, preferably in the stone shield. The improved annular sleeve in the brake monitoring system of this invention is integrally formed of plastic, including opposed sleeve portions, generally semicircular in cross-section, and a longitudinal integral flexible hinge portion interconnecting the adjacent first sides of the opposed generally semicircular sleeve portions, thereby permitting the sleeve to be molded in one piece and the sleeve portions to be received around the rod following assembly of the brake actuator. In the most preferred embodiment of the sleeve, the opposed sides of the generally semicircular sleeve portions, spaced from the integral flexible hinge portion, include integral connector elements for interconnecting the second sides of the sleeve portions. Thus, the sleeve may be formed as an integral molded plastic part which may be easily and accurately assembled on the push rod. The sleeve assembly further includes an adjustable locking clamp, preferably comprised of identical semicircular plastic components, which permit adjustment of the sleeve on the push rod following assembly and clamping of the sleeve to the push rod. In the disclosed and preferred embodiment, the connector element includes a plurality of opposed spaced male and female connector elements which are integrally formed on the second sides of the sleeve, permanently attaching the second sides of the generally semicircular sleeve portions upon receipt of the sleeve on the rod. The clamp includes a pair of opposed resilient clamping members which surround the rod and the rod preferably includes a grooved portions for receipt of the semicircular resilient clamping members and accurate location of the sleeve relative to the push rod.

In the most preferred embodiment of the vehicle brake monitor of this invention, the sensing element in the sleeve is an elongated bar-shaped magnet and the sensing element in the stone shield is a Hall-effect sensor which may be utilized to continuously monitor the location of the sleeve during actuation of the brake actuator by continuously monitoring the magnetic field of the elongated bar-shaped magnet. In the most preferred embodiment, the magnet has a first longitudinal portion which is magnetized on one face to define a north magnetic field and a second longitudinal portion which is magnetized on an adjacent face to define a south magnetic field. The most preferred magnet is a ceramic magnet able to withstand the adverse temperature conditions experienced by brake actuators, wherein the faces of the first and second portions opposite the sensor in the stone shield are magnetized as set forth above. As set forth below, a brake monitoring system having a magnet as described and a sensor in the stone shield may be utilized to monitor an overstroke condition, wherein the push rod extends out of the brake actuator housing beyond the rated stroke indicating wear of the foundation brake or misalignment or wear of the linkages described above, a dragging brake condition, wherein the push rod does not fully retract into the brake actuator, a normal stroke condition and a nonfunctioning brake actuator.

As will be understood, it is necessary to maintain the orientation of the sensing element in the stone shield opposite the sensing element in the sleeve in the improved vehicle brake monitoring system of this invention. This is accomplished in the vehicle brake monitoring system of this invention by providing a keyway slot in the stone shield and an elongated longitudinally extending radial key on the sleeve which is slideably received in the keyway in the stone shield, thereby maintaining the orientation of the sleeve relative to the stone shield during actuation of the brake. The vehicle brake monitoring system of this invention is thus easy to assemble accurately on the brake actuator and the brake actuator push rod stroke monitoring system of this invention is rugged and able to withstand the adverse conditions encountered by the brake actuator. Other advantages and meritorious features of the vehicle brake monitoring system of this invention will be more fully understood from the following description of the preferred embodiments, the claims and the appended drawings, a brief description of which follows.

BRIEF DESCRIPTION OF THE DRAWINGS

FIG. 1 is a side partially cross-sectioned view of a brake actuator having a preferred embodiment of the vehicle brake monitoring system of this invention;

FIG. 2 is an enlarged side partially cross-sectioned view of FIG. 1 as indicated by the encircled portion;

DETAILED DESCRIPTION OF THE PREFERRED EMBODIMENTS

Figure 3:
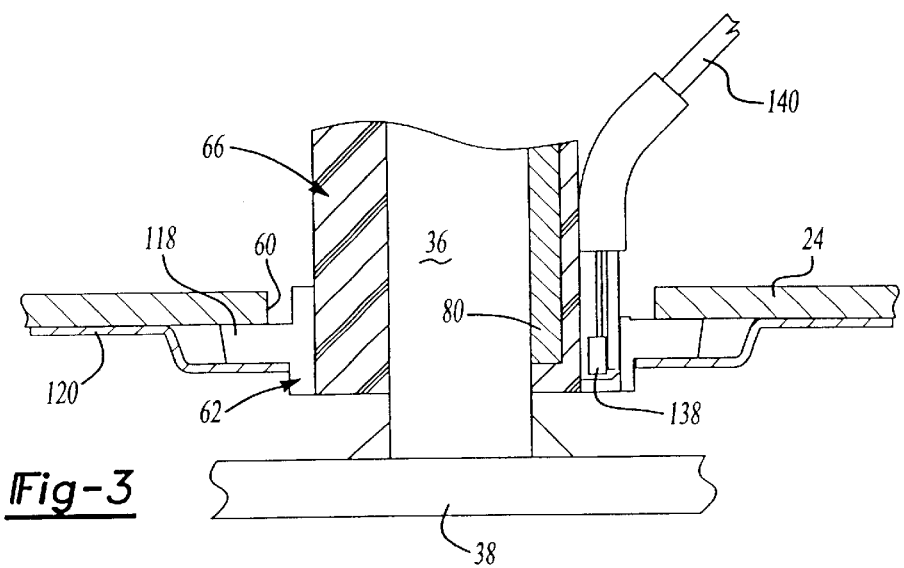
FIG. 3 is a side partially cross-sectioned view of FIG. 1 as indicated by the encircled portion.

As described above, the brake monitoring system of this invention is particularly, but not exclusively, adapted for use with a conventional brake actuator, such as the brake actuator 20 shown in FIG. 1. A brake actuator 20 includes a housing 22 which, in the disclosed embodiment, includes a cup-shaped case 24 and a cup-shaped cover 26. The case 24 includes a radial flange 28 and the cover includes an opposed radial flange 30. The rim portion 31 of the flexible diaphragm 32 is received between the flange portions 28 and 30 of the case 24 and cover 26, respectively, and the flange portions are clamped together by a clamp 34. During assembly of the brake actuator, the flange portions 28 and 30 are pressed together against the rim portion 31 of the flexible diaphragm 32 and clamped in place by the clamp 34. The clamp 34 may be a conventional bolted clamp band as known in the prior art or a continuous ring which is deformed in place to permanently secure the cover 26 on the case 24 after assembly of the brake actuator.

The push rod 36 includes a piston plate 38 which is biased against the central portion of the diaphragm 32 by return spring 48. The free end 40 of the push rod 36 includes a clevis 42 for attachment of the push rod 36 of the brake actuator to a linkage or slack adjuster attached to the foundation brake (not shown). The brake actuator is rigidly secured generally to a bracket 59 by mounting bolts 50. The mounting bolts 50 include a head portion 52 and a shank portion 54 which extend through openings 56 in the case 24. The case is then secured to the bracket 59 by nuts 58 which are threadably received on the threaded end portion of the shank 54. The case 24 includes an opening 60 which receives the reciprocal push rod 36 and a stone shield 62 is located in the case 24 surrounding the opening 60 as described hereinbelow.

A pneumatic connector 44 is connected to the pneumatic braking system of the vehicle (not shown) by line 46. Upon actuation of the vehicle brakes, air under pressure is received through line 46, which applies pressure through port 45, driving the diaphragm 32 upwardly in FIG. 1 against the piston plate 38 and the return spring 48. The cup-shaped diaphragm 32 inverts (as shown in phantom) against the piston plate 38, driving the push rod 36 through the opening 60 in the case 24, actuating the foundation brakes of the vehicle (not shown). In a typical heavy-duty vehicle, the depression of the brake pedal (not shown) pressurizes the line 46, which drives the diaphragm to invert and actuate the foundation brake of the vehicle (not shown). Upon release of the brake pedal, the pressure in line 46 returns to zero and the return spring 48 pushes the piston plate 38 downwardly in FIG. 1 to return the diaphragm to the position shown in FIG. 1. As will be understood, brake actuators 20 of the type shown in FIG. 1 may be mounted in any orientation, generally beneath a truck or the trailer, wherein each axle includes a brake actuator as shown. In a typical application, however, the brake actuator assembly may also include an emergency chamber (not shown) generally mounted in piggyback on the service chamber shown. In such applications, the cover 26 may be replaced by a flange case which defines a service chamber 64 and an emergency chamber (not shown) and the emergency chamber is enclosed by a separate cover as disclosed more fully in U.S. Pat. No. 4,960,036 assigned to the assignee of this application. As will be understood, however, the brake monitoring system of this invention is not limited to the type or configuration of the brake actuator. For example, the brake actuator may be a double diaphragm brake actuator, a piston-type brake actuator having annular seals or a rolling diaphragm.

As set forth above, the brake monitoring system of this invention is specifically adapted to monitor the position of the push rod 36 as it reciprocates through the opening 60 in the housing 22. More specifically, as described below, the brake monitoring system of this invention is adapted to monitor several conditions of the brake actuator Including overstroke, wherein the push rod 36 extends beyond the intended or rated limit of the stroke indicating, for example, a worn brake, a dragging brake condition, wherein the push rod does not return to the ready position shown in FIG. 1, a nonfunctioning brake actuator and a normal stroke condition. The brake monitoring system of this invention may also be utilized to monitor the continuous movement of the push rod 36 during its braking cycle.

Figure 4:
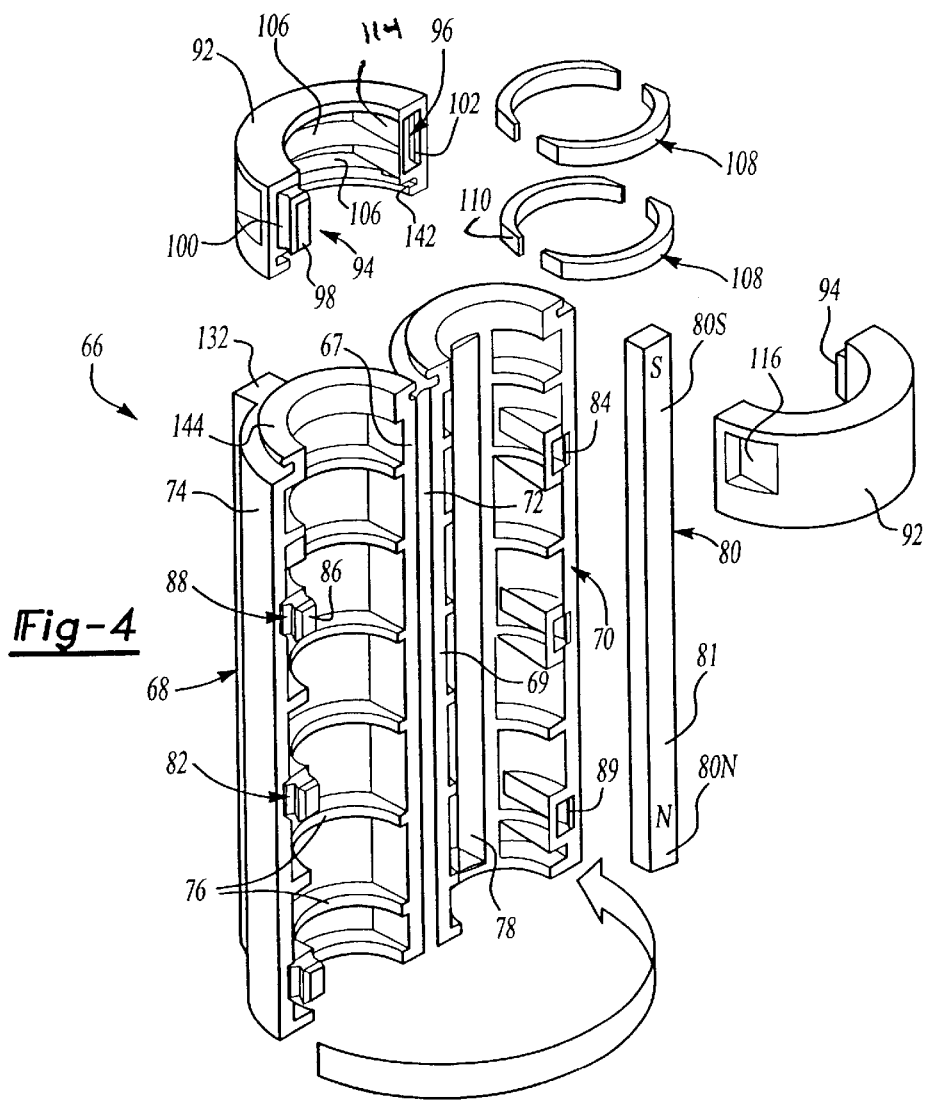
FIG. 4 is an exploded view of the sleeve and adjusting clamp assembly prior to assembly on the push rod.

The improved sleeve assembly of the vehicle brake monitor system of this invention can best be understood from the exploded view of FIG. 4. The integral sleeve 66 includes opposed sleeve portions 68 and 70, which are generally semicircular in cross-section, and an integral flexible hinge portion 72 which extends longitudinally and integrally joins the adjacent sides 67 and 69 of the sleeve portions 68 and 70, respectively. As will be understood from the following description of the assembly, one or the other of the opposed sleeve portions 68 and 70 may extend slightly greater than one half of a circle (semicircular), such that one of the sleeve portions snaps on the push rod 36, provided the combination of the two sleeve portions define an annular sleeve which surrounds the push rod. Each of the generally semicircular sleeve portions 68 and 70 include a generally semicircular body portion 74 and radial generally semicircular ribs 76 which are longitudinally spaced and integral with the body portion 74. A longitudinally extending pocket 78 is defined in one of the opposed sleeve portions 70 which receives the magnet 80 described more fully herein below. One of the sleeve portions 68 and 70 further includes integral male connectors 82 and the other of the sleeve portions 70 include socket-like female connectors 84. The male connectors 82 each include an enlarged head 86 and a groove 88 beneath the head and the female connectors each include internal ribs 89 which receive and lock the head portions 86 in the female connectors 84, such that the male and female connectors 82 and 84 permanently interconnect the open sides of the sleeve portions 68 and 70 when the sleeve 66 is received around the push rod 36 as shown by arrow 90 and in FIG. 1.

The sleeve is accurately located on the push rod by an adjustable clamp 91 (see FIG. 1) by identical generally semicircular clamp members 92 best shown in FIG. 2. The clamp members each include an integral male connector 94 and a female socket or connector 96. The male connectors 94 each include an enlarged head portion 98 and a groove 100 adjacent the head. The female connectors each include a plurality of ribs 102 which receives the head 98 of the male connectors 94 to permanently connect the clamp members. Each of the identical clamp members 92 also include generally semicircular pockets 106 which receive the generally semicircular locking inserts 108. As shown in FIG. 4, each of the locking inserts includes flat end portions 110 which are slideably received and aligned in the slots 114 of the semicircular pockets 106, accurately aligning the locking inserts 108 in the pockets 106. The clamp members 92 further include gripping pockets 116 used during assembly of the clamp members 92 on the push rod as described below.

Figure 5:
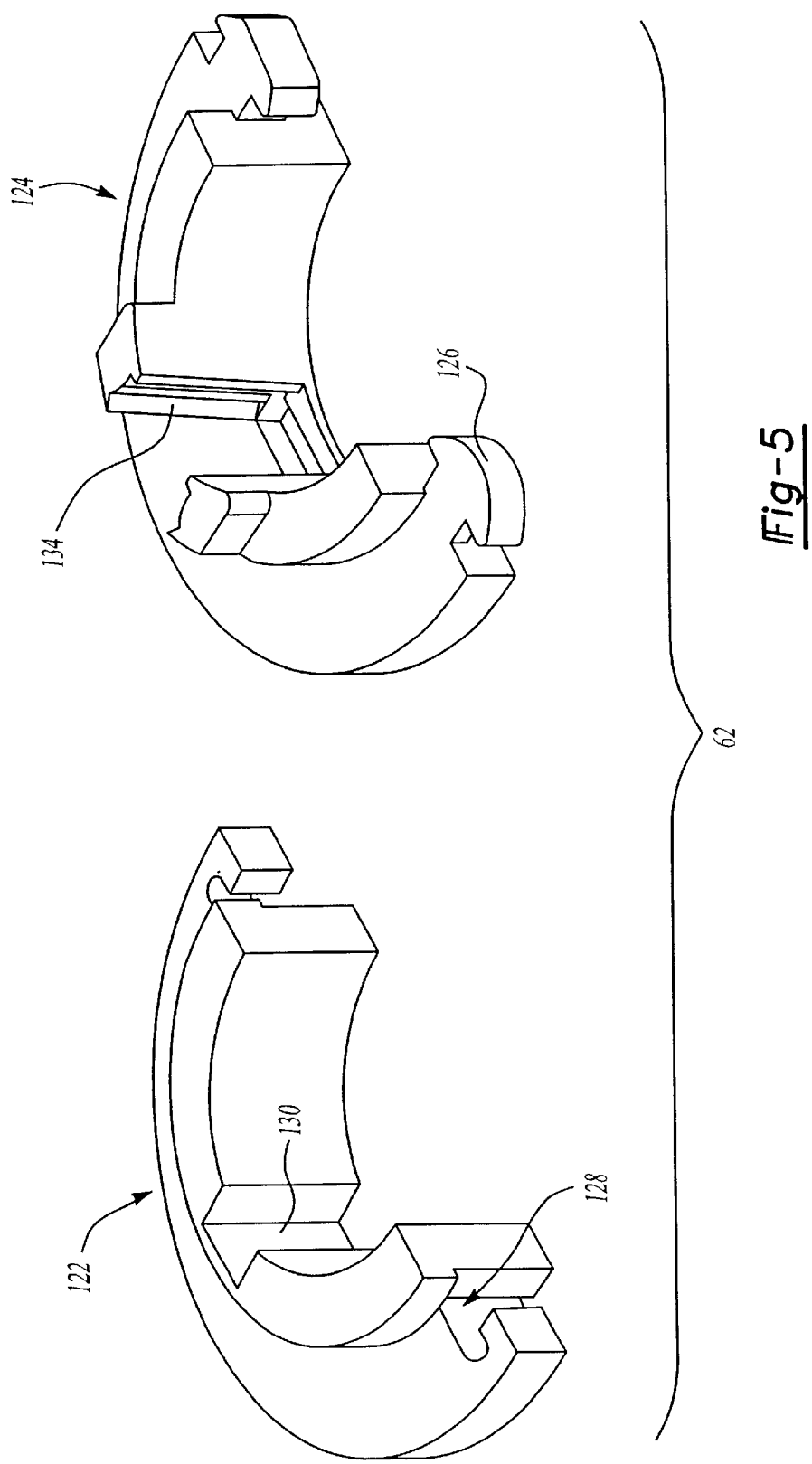
FIG. 5 is an exploded side elevation of the components of the stone shield.

The stone shield 62 includes a radial portion 118 which overlies the inside surface of the cup-shaped case 24 as best shown in FIG. 3. In the preferred embodiment, the stone shield 62 is formed of two generally semicircular components 122 and 124 as shown in FIG. 5. One of the components 124 includes integral male connector portions 126 and the other of the components 122 includes female connector portions 128. Further, one of the components of the stone shield 62 includes a longitudinal slot or keyway 130 and the sleeve includes a radial longitudinally extending rib or key 132 as shown in FIG. 4. As described below, the longitudinally extending key 132 of the annular sleeve 66 is slideably received in the keyway 130 of the stone shield 62. The other component includes a slot 134 which receives the male connector 136 of the sensor as shown in FIG. 1. As described above, the sensor in the stone shield is preferably a Hall-effect sensor 138 shown in FIG. 3. The sensor is connected to the monitoring system of the vehicle by wire 140.

Having described a preferred embodiment of the components of the brake monitoring system, the assembly and operation of the brake monitoring system can now be described. First, the magnet 80 is assembled in the pocket 78 of the sleeve as shown in FIG. 4. In the disclosed embodiment, the magnet is slip fit into the pocket 78 which is dimensioned slightly larger than the external dimensions of the magnet. As described below, the magnet is magnetized to define north and south face poles or fields which are maintained opposite the sensor 138 as shown in FIG. 3. The sleeve 66 is then assembled on the push rod 36 by closing the opposed sleeve portions around the integral flexible hinge portion 72 around the push rod as shown by arrow 90 and sliding the longitudinal key 132 on the sleeve 66 into the keyway 130 of the stone shield, see FIGS. 4 and 5. As set forth above, in the preferred embodiment, the receipt of the male connectors 82 on the sleeve in the female sockets or connectors 84 permanently attaches the free sides of the sleeve, preventing tampering or loosening of the connections. Generally, the stone shield 62 will be assembled in the brake actuator 20 when the brake actuator is assembled. That is, the components 122 and 124 are first preassembled and then received in the opening 60 of the case member 24 prior to receipt of the return spring 48 and the push rod 36, piston plate 38 and stone shield retainer 120 assembly. The diaphragm 32 is then received in the chamber 64 and the cover 26 is assembled on the peripheral edge 31 and the clamping member 34 is attached, clamping the diaphragm 32 as described above.

The annular sleeve 66 is then adjusted on the push rod 36 prior to receipt of the annular clamp 91. As discussed below, the sensor 138 in combination with the magnet 80 is adapted to monitor and sense several conditions of the brake actuator, including an overstroke condition, a dragging brake, a nonfunctioning brake actuator and a normal stroke condition. Therefore, it is essential that the sleeve 66 and the magnet 80 be accurately located on the push rod and the location will depend upon the rated stroke of the push rod 36. Following adjustment of the sleeve 66 on the push rod, which is accomplished by sliding the sleeve on the push rod, the sleeve is clamped on the push rod by the clamp members 92 as now described. As best shown in FIG. 2, the push rod 36 includes a plurality of spaced radial grooves 142 which are located on the push rod approximately where the clamp ring 91 should be attached. The generally semicircular clamp members 92 include a radial groove 142 and the free end of the sleeve includes a rib 144. The generally semicircular clamp members 92 are then secured by forcing the male connector portions 94 into the female sockets or connectors 96, which permanently interconnects the clamp members 92. The radial grooves 142 then bite into the resilient locking inserts 108, securing the clamp to the push rod and accurately locating the sleeve 66 on the push rod as shown in FIG. 2.

The integral sleeve 66 is preferably formed by injection molding a suitable plastic. The plastic must have sufficient flexibility to permit closure of the sleeve portions 68 and 70 around the integral hinge portion 72. Further, the plastic must be selected to withstand the adverse conditions encountered by a brake actuator, particularly the wide range of temperature variations. A brake actuator is typically rated for use in temperatures varying from −40° F. to +185° F. A suitable plastic for this application is a polypropylene copolymer, available from Amoco Corporation, No. 10-3434. The adjustable locking clamp 91 may also be formed of the same plastic material. However, the locking inserts 108 should be formed of a resilient material able to withstand the above-referenced temperature variations and preferably a plastic material which has no memory, such that the locking inserts will maintain clamping force against the push rod. A suitable material for the locking inserts is Krayton™ available from Shell Corporation. The stone shield may also be formed of an elastomeric or plastic material, including the above-referenced polypropylene copolymer. As set forth above, the most preferred sensor 138 is a Hall-effect sensor which is available from several sources, including Allegro of Worchester, Mass.

Having described the preferred embodiments of the components of the brake monitoring system of this invention, the operation of the components may now be described. The magnet 80 may be a continuous bar magnet, wherein the Hall-effect sensor continuously senses a magnetic field of the magnet to determine the position of the magnet in the annular sleeve 66. That is, each magnet has a specific magnetic profile from its north pole to its south pole and the Hall-effect sensor can determine the position of the magnet and sleeve by sensing the changing magnetic field. The data received by the Hall-effect sensor can then be processed through a computer and the visual indicators can then be used to provide a direct readout of the stroke of the push rod 36 on a continuous basis. In a disclosed embodiment, however, the need for a complex computer program for analyzing the location of the push rod and magnet has been eliminated by utilizing a unique magnet in this application which provides the data necessary to determine overstroke and dragging brake conditions as set forth below.

The preferred embodiment of the magnet 80 in this application is a magnet, wherein the face of the magnet opposite the sensor may be magnetized, such as a ceramic or ferrite magnet, such as a Grade 8 ceramic magnet available from Adams Magnetics of Elizabethtown, N.J. By using suitable jigs, as known in the art, a portion of one face may be magnetized with one magnetic field and the adjacent face may be magnetized with the opposite magnetic field. In the disclosed embodiment, one face 80N is magnetized with a north magnetic field and the adjacent face 80S is magnetized with a south magnetic field as shown in FIG. 4. The transition line 81 has no magnetic field. As will be understood by those skilled in this art, the face opposite face 80N will have a south magnetic field and the face opposite the face 80S will have a north magnetic field. Thus, the Hall-effect sensor 138 shown in FIG. 3, which is opposite the faces 80N and 80S of the magnet, can easily identify the magnetic fields 80N and 80S and the transition line 81 as the push rod 36 and the sleeve 66 reciprocate through the opening 60 of the housing. The length of the magnetic faces 80N and 80S and the transition line 81 will depend upon the stroke of the brake actuator. In a typical brake actuator having a 2.5 inch stroke, for example, the face 80S sho be about 2 inches and the face 80N should be about ½ inch. Brake actuators of the type disclosed in this application generally have a stroke ranging from about 2.25 to 3 inches, wherein the face 80S should be approximately ¾ of the total length of the magnetic. In the fully retracted position of the push rod 36 and sleeve 66 shown in FIG. 1, the sensor 138 (see FIG. 3) is just off or above the end of the magnet 80. The preferred Hall-effect sensor is a ratio metric linear Hall-effect sensor, wherein the output is proportional to the input voltage and the applied magnetic field. In a disclosed embodiment, the input voltage is five volts. Thus, the output from the Hall-effect without the magnetic field is 50 percent or 2.5 volts. Thus, the output from the sensor in the fully retracted or rest position shown in FIG. 1 is 2.5 volts. Then, when the operator depresses the brake and the stoplight is on, pneumatic pressure through line 46 begins to invert the diaphragm 32, driving the piston plate 38, push rod 36 and the magnet 80 in the sleeve 66 through the opening 60 in the housing and the output voltage increases up to a maximum of 5 volts indicating a normal stroke condition. However, when the sensor is located opposite the transition line 81 between the faces having a south magnetic field and 80N having a north magnetic field, the output voltage from the sensor again decreases to 2.5 volts or less in the north magnetic field, indicating an overstroke condition. The output voltage drops further in the face 80N having a north magnetic field. Thus, the brake monitoring system of this invention can then indicate either a normal stroke condition or an overstroke condition. As will be understood, the sensor must also be connected to the brake light wiring.

The brake monitoring system of this invention can also sense a dragging brake condition, wherein the brake actuator does not fully retract to the position shown in FIG. 1. As set forth above, when the operator releases the brake pedal, the pneumatic pressure through line 46 returns to zero and the return spring 48 urges the piston plate 38 downwardly in FIG. 1, withdrawing the push rod and the sleeve 66 to the position shown. If the brake light is not on and the return voltage from the sensor is 2.5 volts or less, the system indicates a dragging brake. A dragging brake is also indicated when the return voltage is greater than 2.8 volts. That is, the brake actuator did not return to its ready position. Further, the system may also be utilized to indicate a brake actuator failure. That is, if the system receives a signal that the brake light is on and the output voltage from the sensor is 2.5 volts or less, this indicates a brake failure. Finally, the sensor will also indicate a sensor fault, wherein the output voltage is 1 volt or less. Thus, the brake monitoring system of this invention will actually sense and indicate five functions of each brake actuators, including an overstroke condition, a dragging brake, a nonfunctioning brake actuator, normal stroke and sensor fault. These conditions may, for example, be easily monitored by the vehicle operator by flashing lights on the front of the trailer opposite the back window of the tractor or truck, such as green for normal stroke operation, red for overstroke, flashing red for dragging brake, et cetera. Alternatively, the sensors may be connected to a heads up display in the cab or a monitor in the cab. Thus, this embodiment of the invention including a single magnet having face portions opposite the sensors with opposite magnetic fields eliminates the requirement for a complex computer system, but simultaneously measures several conditions of each of the brake actuators.

Thus, the brake monitoring system of this invention is relatively simple to install, yet accurate, reliable and rugged. Further, the brake monitoring system of this invention is able to withstand the adverse conditions encountered by brake actuators, including extreme temperature variations, without failure. For example, Hall-effect sensors of the type described above are able to withstand extreme temperature variations from −40° F. to +302° F. The deviation of the ceramic magnet described above is about 0.1% per ° C. and therefore experiences only about 12% decrease in the residual magnetic flux density or field strength at 185° F. and a 13% decrease at −40° F. The preferred polypropylene copolymer used for the sleeve 66, adjustable clamp ring 91 and the stone shield 62 will also withstand extreme temperature variations and road debris. Further, as described above, the sleeve 66 is preferably molded in one piece, eliminating errors in assembly and the sleeve may be accurately adjusted before receipt of the clamp ring 91. As will be understood, however, various modifications may be made to the disclosed preferred embodiment of the brake monitoring system of this invention within the purview of the appended claims. For example, various sensors and magnets may be utilized and various modifications may be made to the sleeve and clamp ring.

What is claimed is:

1. A method of assembling a brake monitor on a brake actuator, comprising the following steps:

affixing a first sensor element on a brake actuator housing member adjacent an opening through said housing member which receives a pushrod reciprocating through said opening;

assembling a second sensor element in an elongated annular pushrod sleeve having an axial opening therethrough;

assembling said pushrod sleeve on said pushrod with said axial opening of said pushrod sleeve receiving said pushrod;

moving said pushrod sleeve axially on said pushrod and aligning said first and second sensor elements to indicate a position of said pushrod relative to said housing; and affixing said annular pushrod sleeve on said pushrod at said position.

2. The method of assembling a brake monitor on a brake actuator as defined in claim 1, wherein said sensor element is a magnet and forming said annular pushrod sleeve to include a pocket extending axially and radially from said axial opening, and inserting said magnet in said pocket.

3. The method of assembling a brake monitor on a brake actuator as defined in claim 1, wherein said sensor element is affixed on said housing member by assembling said first sensor element in an annular sensor sleeve having an opening therethrough, assembling said sensor sleeve in said housing with said opening through said sensor sleeve coaxially aligned with said opening through said housing member, and then inserting said pushrod through said opening in said sensor sleeve.

4. The method of assembling a brake monitor on a brake actuator as defined in claim 3, wherein said sensor sleeve is comprised of two generally semi-circular components and said method including assembling said semi-circular components of said sensor sleeve, then assembling said sensor sleeve in said housing member.

5. The method of assembling a brake monitor on a brake actuator as defined in claim 3, wherein one of said pushrod sleeve and said sensor sleeve includes a radial keyway slot and the other of said pushrod sleeve and said sensor sleeve includes a radial key, said method including aligning said first and second sensor elements by slidably receiving said key in said keyway slot.

6. The method of assembling a brake monitor on a brake actuator as defined in claim 1, wherein said method includes forming said pushrod sleeve from a polymer comprising two elongated pushrod sleeve portions generally semi-circular in cross-section and a longitudinal flexible hinge portion interconnecting a first side of said generally semi-circular sleeve portions, and assembling said sensor sleeve on said pushrod by closing said semi-circular portions of said pushrod sleeve around said pushrod.

7. The method of assembling a brake monitor on a brake actuator as defined in claim 1, wherein said method includes affixing said annular pushrod sleeve on said pushrod by affixing a clamping ring to said pushrod and said pushrod sleeve thereby affixing said pushrod sleeve on said pushrod at said position.

8. A method of assembling a brake monitor on a brake actuator, comprising the following steps:

affixing a sensor to a stone shield utilized to seal an opening in a service chamber of a brake actuation assembly;

positioning a sleeve having a magnet affixed thereto onto a pushrod of said brake actuation assembly;

adjusting the position of said sleeve axially on said pushrod thereby positioning said magnet in a fixed location relative to said pushrod;

inserting said pushrod into said opening disposed in said service chamber through said stone shield; and adjusting the position of said sensor affixed to said stone shield relative to said magnet disposed in said sleeve to monitor the location of said pushrod.

9. A method as set forth in claim 8 further including the step of clamping said sleeve onto said pushrod thereby affixing the location of said magnet relative to said pushrod.

10. A method as set forth in claim 8 wherein said step of inserting said pushrod through said stone shield is further defined by securing semicircular sections of said stone shield around said pushrod.

11. A method as set forth in claim 8 wherein said step of adjusting the position of said sensor relative to said stone shield is further defined by inserting a key on said sleeve through a keyway on said stone shield.

12. A method of assembling a brake monitor on a brake actuator, comprising the following steps:

assembling a sensor element in a sensor sleeve having an opening therethrough;

assembling said sensor sleeve in a brake actuator housing member having a pushrod opening and coaxially aligning said opening in said sensor sleeve with said pushrod opening;

inserting a pushrod through said opening in said sensor sleeve;

assembling a magnet in an annular elongated pushrod sleeve having an axial opening therethrough;

assembling said annular pushrod sleeve on said pushrod with said pushrod extending through said axial opening in said pushrod sleeve;

moving said pushrod sleeve axially on said pushrod and aligning said magnet on said pushrod sleeve with said sensor in said sensor sleeve to indicate a position of said pushrod relative to said sensor; and affixing said annular pushrod sleeve on said pushrod at said position.

13. The method of assembling a brake monitor on a brake actuator as defined in claim 12, wherein said method includes forming said pushrod sleeve from a polymer comprising two elongated components each having a generally semi-circular cross-section and a longitudinal flexible hinge portion interconnecting a first side of each of said components, and assembling said pushrod sleeve on said pushrod by closing a second side of each of said semi-circular components around said pushrod.

14. The method of assembling a brake monitor on a brake actuator as defined in claim 12, wherein said method includes forming a pocket in said pushrod sleeve extending axially and radially from said axial opening and inserting said magnet in said pocket prior to assembling said pushrod sleeve on said pushrod.

15. The method of assembling a brake monitor on a brake actuator as defined in claim 12, wherein said method includes affixing said pushrod sleeve on said pushrod by affixing a locking ring to said pushrod sleeve and said pushrod.

16. The method of assembling a brake monitor on a brake actuator as defined in claim 12, wherein said method includes forming said sensor sleeve from two generally semi-circular components and assembling said components prior to assembling said sensor sleeve in said brake actuator housing member.

17. A vehicle brake monitor, comprising:
- at least one service chamber defined by a cup shaped housing and a cover; said housing defining an opening having a pushrod for actuating a brake slidably inserted therethrough;
- a sleeve circumscribing said pushrod and defining a pocket having an elongated magnet disposed therein oriented generally parallel to an axis of said pushrod, wherein said sleeve derives reciprocating movement through said opening from said pushrod;
- a stone shield circumscribing said sleeve and being positioned adjacent said housing substantially sealing said opening around said sleeve thereby preventing stones and debris from entering said chamber through said opening, said stone shield comprising two interconnecting parts having a sensor disposed in one of said parts for sensing the location of said magnet relative to said stone shield when said sleeve is reciprocating through said opening.

18. A vehicle brake monitor set forth in claim 17, wherein said sleeve includes a key and said stone shield includes a keyway guiding said sleeve in a longitudinal direction through said opening thereby maintaining said magnet in a position proximate to said sensor.

19. A vehicle brake monitor set forth in claim 17, wherein said sensor comprises a Hall effect sensor potted in one of said interconnecting parts of said stone shield proximate to said magnet thereby determining the location of said pushrod by detecting a change in magnetic field emitted by said magnet.

\* \* \* \* \*